United States Patent
Speidel

(10) Patent No.: US 12,155,095 B2
(45) Date of Patent: Nov. 26, 2024

(54) TERMINAL BIPOLAR PLATE FOR AN ELECTROCHEMICAL SYSTEM, PLATE ASSEMBLY, AND ELECTROCHEMICAL SYSTEM

(71) Applicant: Reinz-Dichtungs-GmbH, Neu-Ulm (DE)

(72) Inventor: André Speidel, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 520 days.

(21) Appl. No.: 17/448,185

(22) Filed: Sep. 20, 2021

(65) Prior Publication Data
US 2022/0093941 A1   Mar. 24, 2022

(30) Foreign Application Priority Data
Sep. 21, 2020  (DE) ...................... 20 2020 105 396.5

(51) Int. Cl.
*H01M 8/0258*   (2016.01)
*H01M 8/18*   (2006.01)

(52) U.S. Cl.
CPC ......... *H01M 8/0258* (2013.01); *H01M 8/188* (2013.01)

(58) Field of Classification Search
CPC .. H01M 8/2483; H01M 8/0258; H01M 8/188; H01M 8/0206; H01M 8/0221; H01M 8/026; H01M 8/0286; H01M 8/248; H01M 8/0254; H01M 8/0271; H01M 8/0202; H01M 8/04029
See application file for complete search history.

(56) References Cited

U.S. PATENT DOCUMENTS

| | | | |
|---|---|---|---|
| 11,031,610 B2* | 6/2021 | Ikeda | H01M 8/2459 |
| 2003/0059664 A1* | 3/2003 | Menjak | H01M 8/0293 429/513 |
| 2009/0075154 A1* | 3/2009 | Madeleine | H01M 8/0271 429/413 |
| 2010/0136460 A1* | 6/2010 | Shibata | H01M 8/0247 429/507 |
| 2010/0248066 A1* | 9/2010 | Frederiksen | H01M 8/2483 429/513 |
| 2013/0130139 A1* | 5/2013 | Kah | H01M 8/2432 429/457 |
| 2016/0104911 A1* | 4/2016 | Kurihara | H01M 8/2485 429/458 |
| 2018/0040907 A1* | 2/2018 | Ishida | H01M 8/0258 |
| 2018/0269497 A1* | 9/2018 | Kunz | H01M 8/247 |
| 2022/0320525 A1* | 10/2022 | Baverel | H01M 8/0284 |

FOREIGN PATENT DOCUMENTS

| | | |
|---|---|---|
| DE | 202014002512 U1 | 6/2015 |
| WO | 2019229138 A1 | 12/2019 |

* cited by examiner

*Primary Examiner* — Michael L Dignan
(74) *Attorney, Agent, or Firm* — McCoy Russell LLP

(57) ABSTRACT

A plate assembly for an electrochemical system, comprising an end plate, a first separator plate which adjoins the end plate and which has a plate plane, a second separator plate which adjoins the first separator plate, the second separator plate having at least one media-guiding second through-opening, wherein an orthogonal projection of the second through-opening onto the first separator plate perpendicular to the plate plane defines a projection area, wherein the first separator plate has in the region of the projection area no through-opening or a first through-opening, the area of which is less than 20% of the area of the second through-opening.

15 Claims, 6 Drawing Sheets

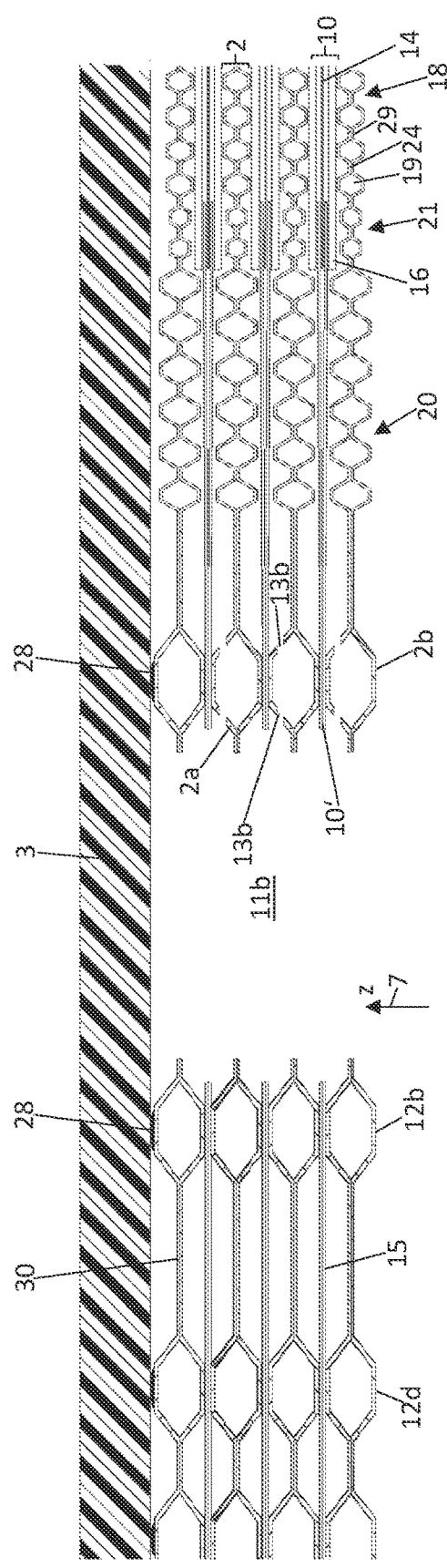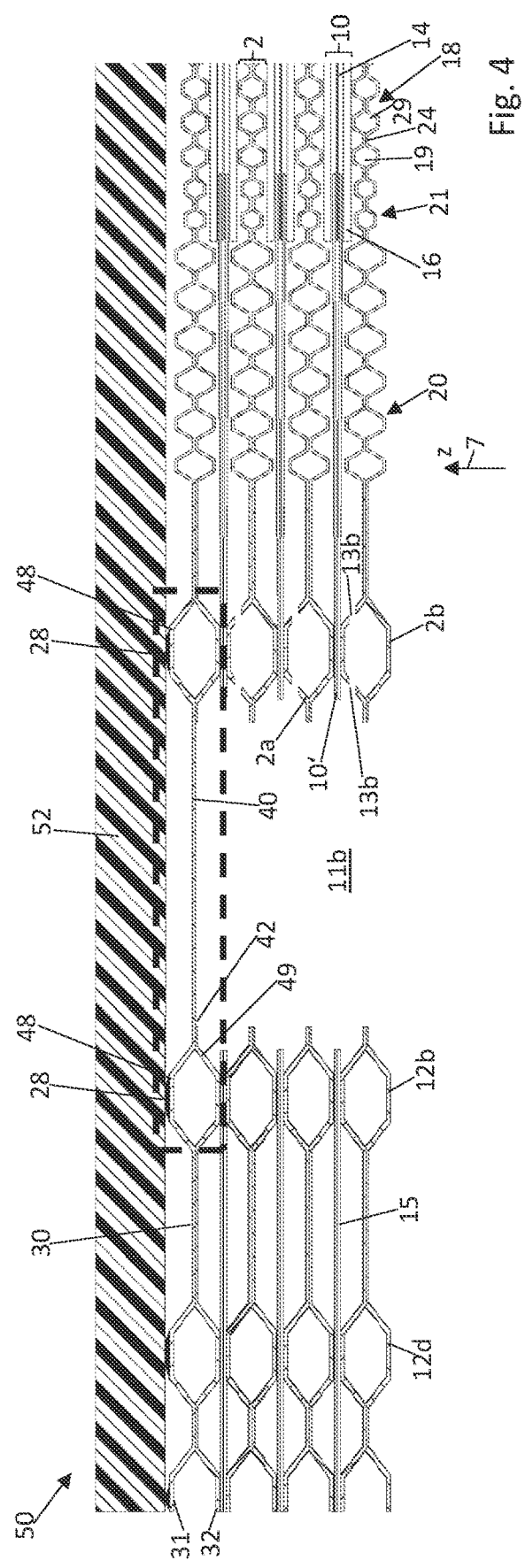

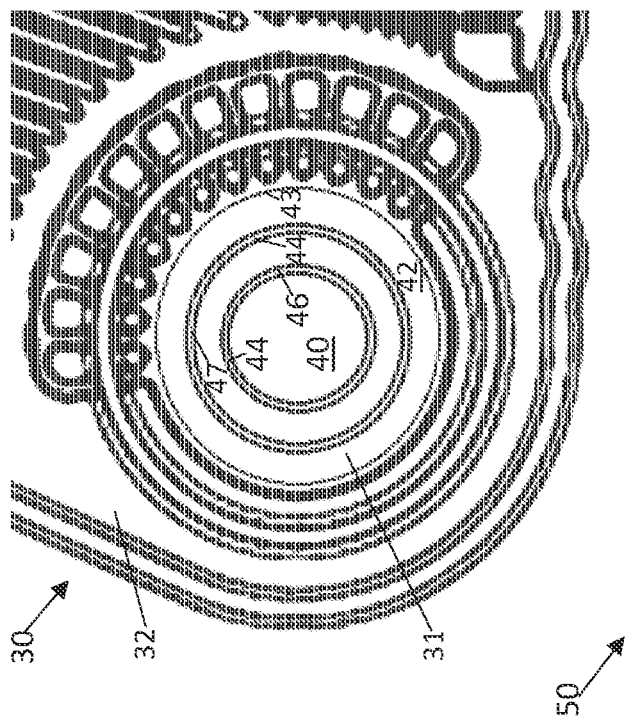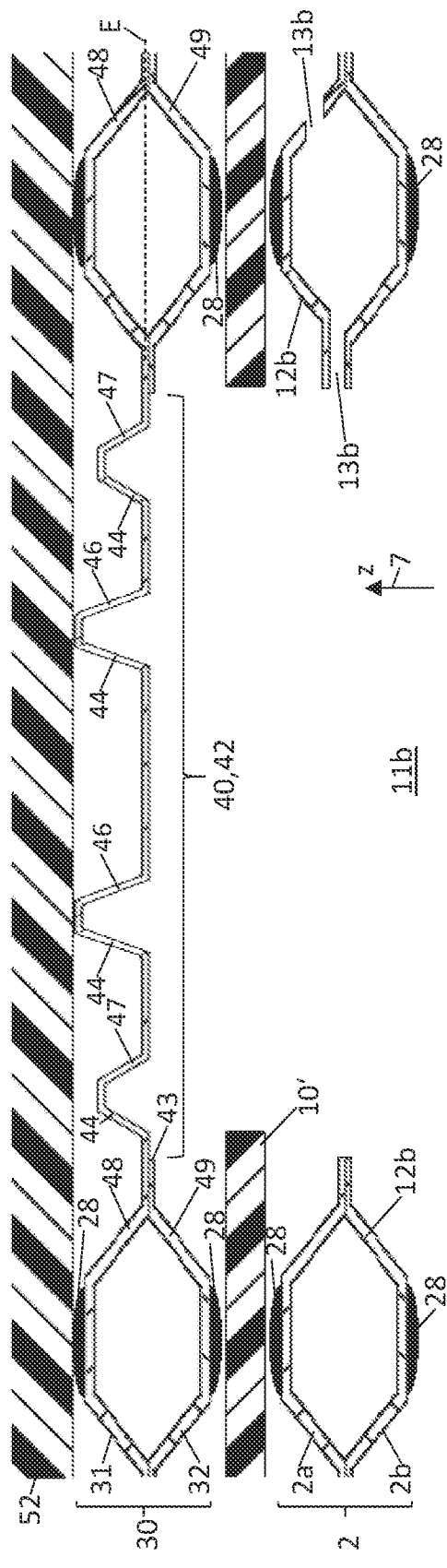

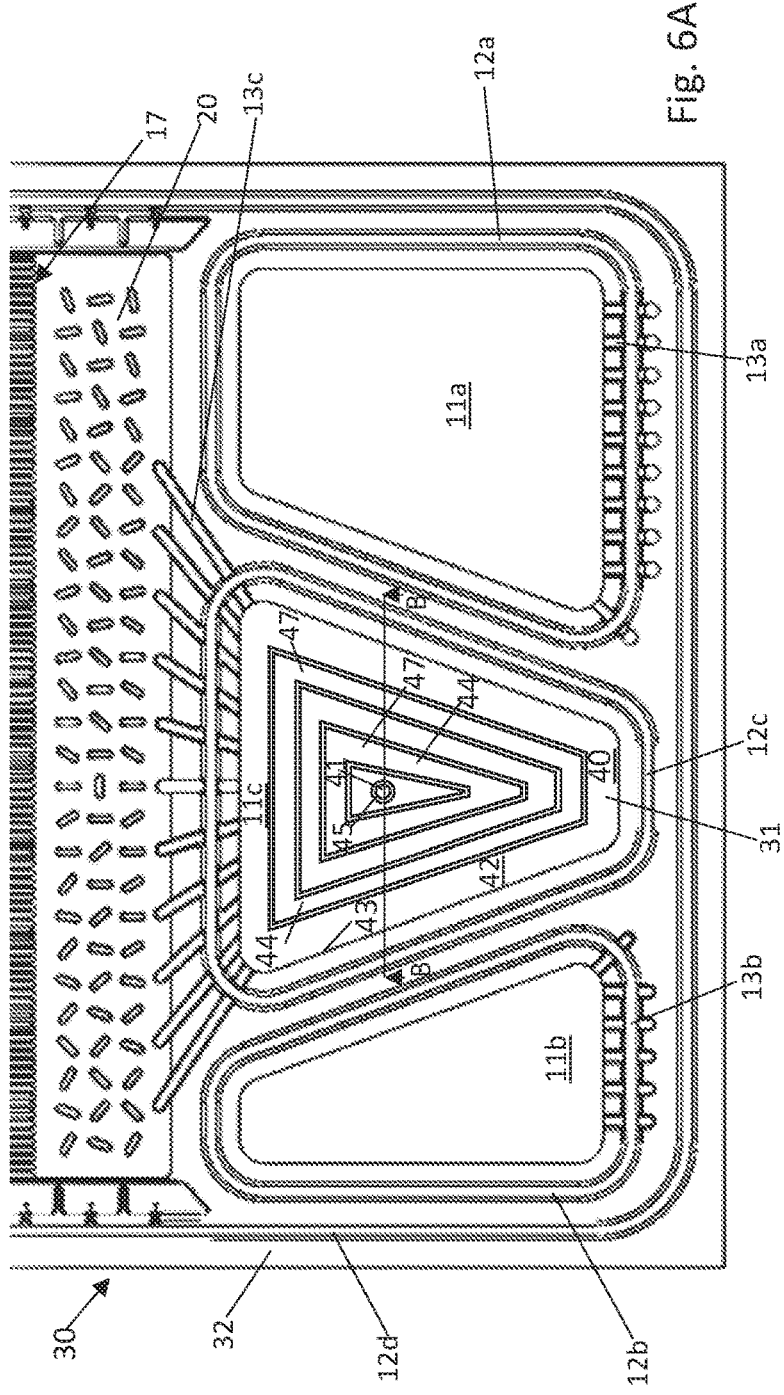
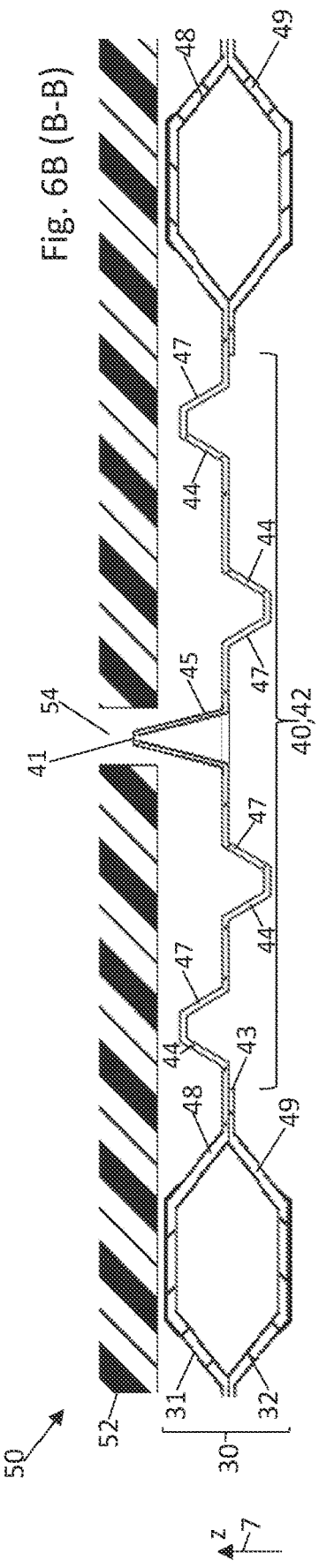

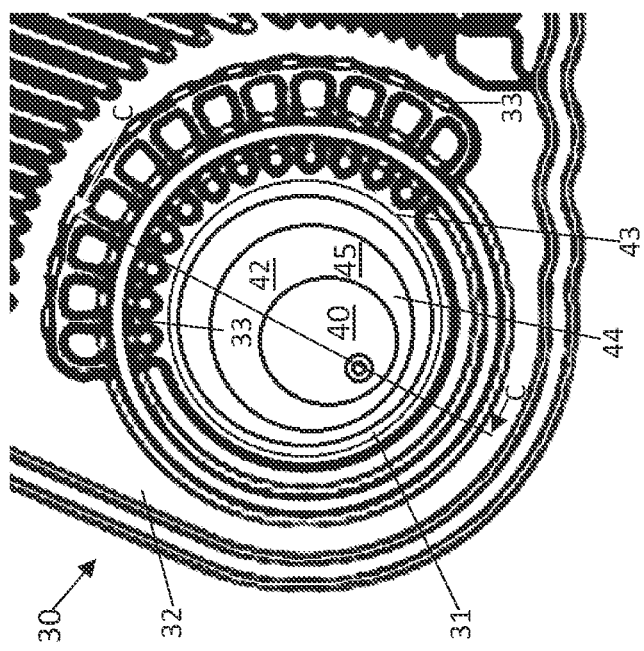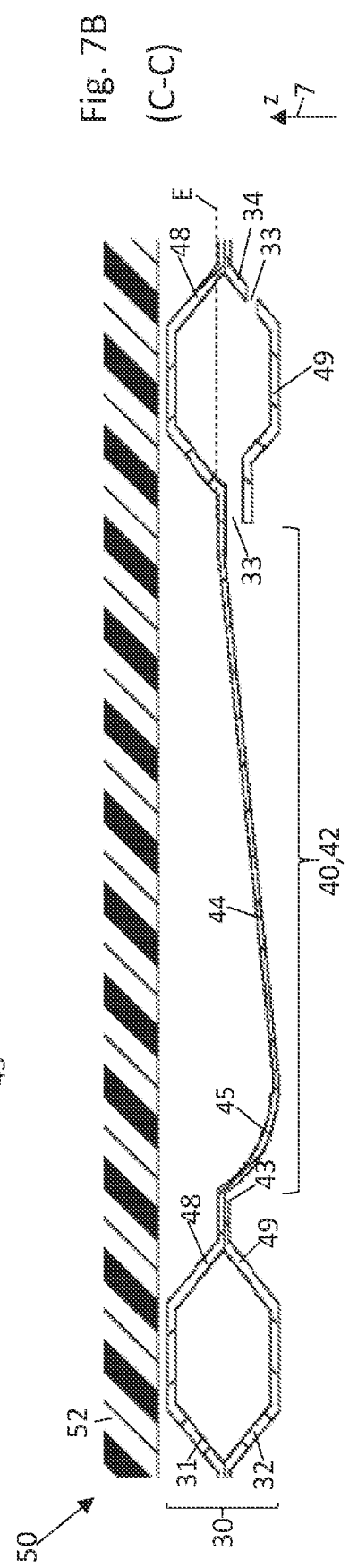

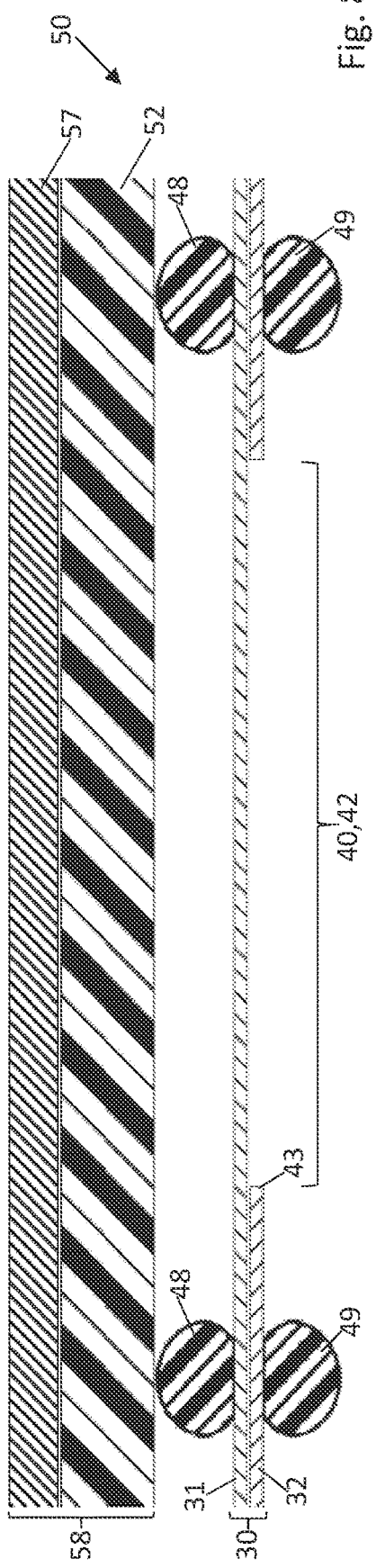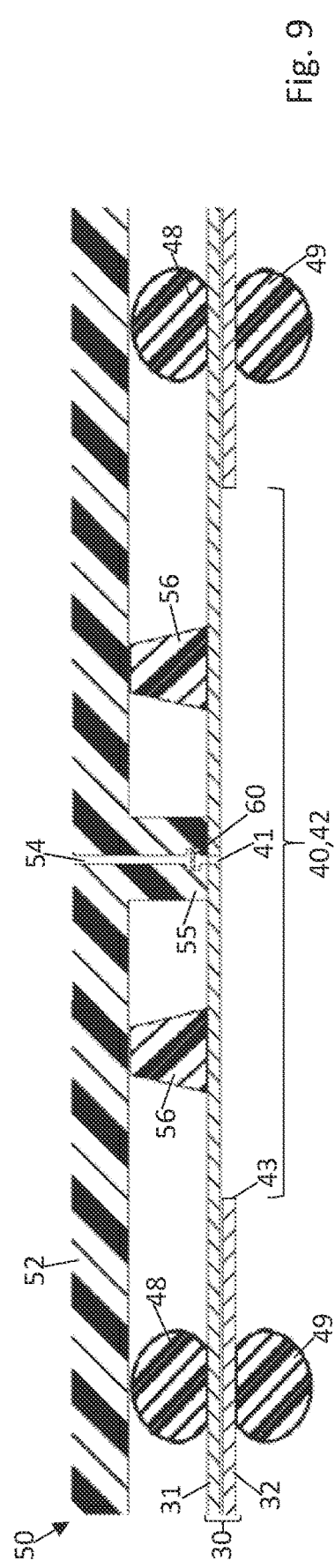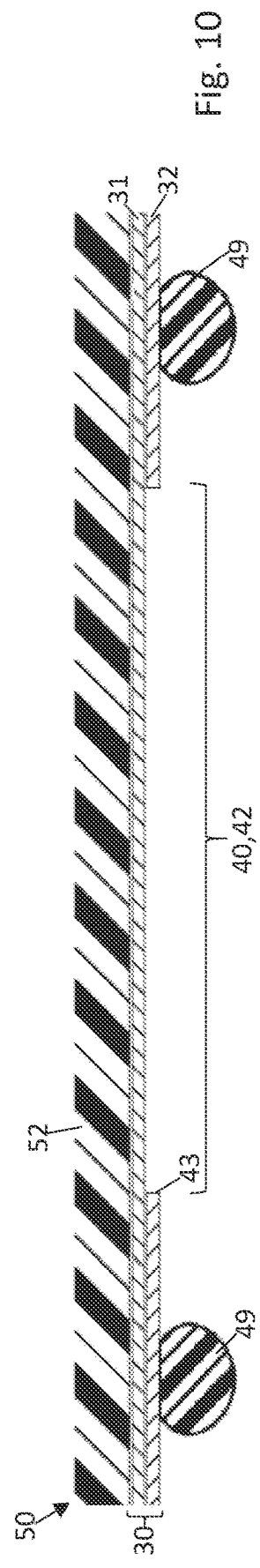

TERMINAL BIPOLAR PLATE FOR AN ELECTROCHEMICAL SYSTEM, PLATE ASSEMBLY, AND ELECTROCHEMICAL SYSTEM

CROSS-REFERENCE TO RELATED APPLICATION

The present application claims priority to German Utility Model Application No. 20 2020 105 396.5, entitled "TERMINAL BIPOLAR PLATE FOR AN ELECTROCHEMICAL SYSTEM, PLATE ASSEMBLY, AND ELECTROCHEMICAL SYSTEM", and filed on Sep. 21, 2020. The entire contents of the above-listed application is hereby incorporated by reference for all purposes.

TECHNICAL FIELD

The present disclosure relates to a terminal bipolar plate for an electrochemical system, and to a plate assembly. The present disclosure also relates to an electrochemical system comprising such a plate assembly and comprising such a terminal bipolar plate. The electrochemical system may be a fuel cell system, an electrochemical compressor, an electrolyser, a humidifier for an electrochemical system, or a redox flow battery.

BACKGROUND AND SUMMARY

Known electrochemical systems of the aforementioned type usually comprise a stack of electrochemical cells, which are each separated from one another by bipolar or monopolar plates. Such bipolar or monopolar plates may serve for example for indirectly electrically contacting the electrodes of the individual electrochemical cells (for example fuel cells) and/or for electrically connecting adjacent cells (series connection of the cells). The bipolar or monopolar plates are typically formed of two layers which are joined together, of which each individual layer can be referred to as a separator plate. The separator plates (individual plates) of the bipolar or monopolar plates may be joined together in a materially bonded manner, for example by one or more welded joints, such as by one or more laser-welded joints. The term bipolar or monopolar plate results from the arrangement of the plate in question, which comprises two separator plates, relative to the media. In the case of bipolar plates, different media flow on the two surfaces; in the case of monopolar plates, the same media flow on the two surfaces. Where mention is made below of bipolar plates or a bipolar plate, this may also mean monopolar plates or a monopolar plate, unless stated otherwise.

The separator plates or the layers may each have or form structures which are designed for example to supply one or more media to the electrochemical cells bounded by adjacent separator plates and/or to remove reaction products therefrom. The media may be fuels (for example hydrogen or methanol) or reaction gases (for example air or oxygen). Furthermore, the separator plates may have structures for guiding a cooling medium through the bipolar plates formed of two separator plates, such as through a cavity enclosed by the separator plates. Furthermore, the separator plates may be designed to transmit the waste heat that arises when converting electrical and/or chemical energy in the electrochemical cell, and also to seal the various media channels and cooling channels with respect to one another and/or with respect to the outside.

Furthermore, the separator plates usually each have a plurality of through-openings. Through the through-openings, the media and/or the reaction products can be conducted to the electrochemical cells bounded by adjacent separator plates of the stack or into the cavity formed by the individual plates of the separator plate, or can be conducted out of the cells or out of the cavity.

The electrochemical cells also each comprise one or more membrane electrode assemblies (MEAs). The MEAs may have one or more gas diffusion layers, which are usually oriented towards the separator plates and are configured for example as a metal or carbon fleece. In addition, the MEAs each have a frame-like reinforcing layer, which surrounds the electrochemically active region of the MEA and is typically made of an electrically insulating material.

The stack comprising the bipolar plates and the electrochemical cells is usually terminated at each end of the stack by an end plate or a terminal plate. Here, a terminal plate is to be understood as a combination of an end plate and at least one outer plate. The at least one outer plate that is possibly present is in this case arranged on the surface of the end plate facing away from the plate stack. When a terminal plate is used, the end plate thus usually serves primarily for insulation purposes, and the outer plate serves to absorb forces. At least one of the end plates or one of the terminal plates typically has one or more media ports. Lines for supplying the media and/or for removing the reaction products can be connected to said ports. In addition, at least one of the end plates or one of the terminal plates usually has electrical connections, via which the cell stack can be electrically connected to a consumer or, in the case of an electrolyzer, to a voltage source. The respective other end plate and/or terminal plate may also serve only for compressing and/or sealing the stack and as such may not have media ports. The bipolar plate of the stack that is located closest to or adjacent to an end plate or the end plate of a terminal plate will also be called the terminal bipolar plate.

A sealing device is typically arranged between the terminal bipolar plate and the end plate. This sealing device serves to seal the system with respect to the outside and/or to seal various lines or portions of the electrochemical system with respect to one another. In known systems, the sealing between the terminal bipolar plate and the end plate takes place for example by means of metal beads applied as a coating by screen printing. However, this screen print tends to adhere primarily to the mechanically machined, at least slightly rough plastic surfaces of the end plate. The sealing device may also become detached or damaged if the terminal bipolar plate and the end plate, which are usually made of different materials and therefore have different thermal expansion coefficients, shift relative to one another, for instance in the lateral direction, that is to say orthogonal to the stacking direction, in the event of a temperature change. The bipolar plates and thus also the terminal bipolar plate are usually made of metal, for example of stainless steel, whereas the end plate is usually made of plastic or largely of plastic.

In some applications, the sealing device must perform its function equally reliably in a temperature range between a minimum temperature of for example −40° C. and a maximum temperature of for example +100° C. Such temperature changes may occur during the start of operation of a fuel cell system at ambient temperature or during a cold start in winter at sub-zero temperatures up to the maximum operating temperature of the stack. The effects of the detachment and adhesion of the coating become evident when disassembling the stack, in which case the coating is pulled away from the terminal bipolar plate on account of having previously become detached.

In order to prevent or at least reduce this relative shift in the event of a temperature change, the end plate could also be made of metal. However, this increases both the manufacturing cost and the weight of the system, which is undesirable for many applications. On the other hand, the sealing of the boundary layer between the end plate and the terminal bipolar plate by means of a rubber seal (O-ring or floppy seal) partially inset into at least one of the plates may lead to difficulties in coordinating the height and force of the sealing system due to the high degree of compression set in such seals.

This problem is also known from the publication DE 20 2014 002 512 U1. Said document proposed a sealing device between one of the two end plates and the terminal bipolar plate, the seal being designed in such a way that, in the event of temperature changes, the sealing function takes place only or at least also by way of a sliding of the end plate and/or of the terminal bipolar plate on the sealing device. However, this requires additional surface machining and/or a special coating.

The object of the present disclosure is to provide a plate assembly, a terminal bipolar plate and an electrochemical system that exhibit good sealing. The plate assembly, the terminal bipolar plate and the electrochemical system should also be able to be manufactured as easily and as inexpensively as possible.

This object is achieved by embodiments of the present disclosure. Exemplary embodiments are described in the following description.

Accordingly, a plate assembly for an electrochemical system is proposed. The plate assembly comprises:
an end plate,
a first separator plate which adjoins the end plate and which has a plate plane, and
a second separator plate which adjoins the first separator plate, the second separator plate having at least one media-guiding second through-opening.

An orthogonal projection of the second through-opening onto the first separator plate perpendicular to the plate plane defines a projection area, wherein the first separator plate has in the region of the projection area
no through-opening or
a first through-opening, the area of which is less than 20% of the area of the second through-opening.

In the first case, therefore, no through-opening is present in the first separator plate in the region of the projection area. The entire region of the projection area is therefore closed and is formed by plate material of the first separator plate. This eliminates the need for a separate seal comprising an elastomer or a screen-printed coating, which in the prior art is arranged between the end plate and the first separator plate. Instead, the plate material of the first separator plate fluidically seals off the region of the projection area. As a result, the above-described relative movements between the end plate and the first separator plate are unproblematic and have no negative effect on the sealing behavior of the plate assembly. In addition, the surface quality of the end plate need not correspond to that of a sealing surface, but rather serves only for the bearing of the first separator plate. Surface finishing steps for the end plate, whether as part of the actual manufacture or as an aftertreatment, can therefore be omitted and costs can be lowered.

The solution described also does not give rise to any additional costs since the first separator plate and the second separator plate can in principle be manufactured in the same manufacturing tool or by means of the same manufacturing tools, wherein, when manufacturing the first separator plate, the step of providing through-openings, as contained in the second separator plate, is omitted.

The end plate adjoining the first separator plate is an end plate in which no media ports are provided or in which no media port is provided at least for the medium conducted through said second through-opening. In addition, in some embodiments, at least one outer plate may be provided, which in combination with the end plate forms a terminal plate. The at least one outer plate that may be present is in this case arranged on the surface of the end plate facing away from the first separator plate.

If the first through-opening is present, it differs from the second through-opening by a significantly reduced area, namely less than 20%. The area of the first through-opening is often less than 10% of the area of the second through-opening, less than 7%, or less than 5%. Compared to the second through-opening, therefore, the first through-opening is much smaller. As a result, a corresponding seal, which seals the first through-opening with respect to the surrounding environment, can be made much smaller than previously known seals, which simplifies the manufacture of this seal. In this case, it is also possible to use a screw-in insert, which can be used for many different product ranges regardless of the often complex geometry of the second through-opening and other features of the respective plate assembly.

The first through-opening may be designed for example as a vent opening. In addition, the first through-opening may be designed to compensate for pressure differences inside and/or outside the plate assembly. To this end, a corresponding valve may be fluidically connected to the first through-opening. The end plate may have an outlet opening, which is fluidically connected to the first through-opening. If a terminal plate is present, which comprises both an end plate and also at least one outer plate, it is advantageous if the entire terminal plate, that is to say the end plate and the at least one outer plate, has such an outlet opening. The valve may be arranged at the outlet opening or the first through-opening. A flow path may be formed from the first through-opening to the outlet opening. The valve may be located in the flow path between the first through-opening and the outlet opening. Instead of a valve or in addition to the valve, the first through-opening may be provided with a closure, such as a closure cap, which sealingly closes off the first through-opening. In addition or as an alternative, the outlet opening may have such a closure.

The second through-opening of the second separator plate is designed for example for the passage of cooling fluid. When filling the assembly with cooling fluid, for example at the time of original filling (that is to say at the time of first filling), the first through-opening may be left open, for example by removing the closure cap or due to the fact that the closure cap is not yet attached to the first through-opening. As a result, air remaining in the plate assembly can escape through the first through-opening, and may be discharged outwards through the outlet opening. After filling, the first through-opening and/or the outlet opening is closed by the respective closure cap or closure. It would also be conceivable to carry out the venting prior to the plate assembly or the electrochemical system being commissioned. A permanently open mode of the first through-opening and/or the outlet opening is in principle also conceivable and usually depends on the other operating conditions.

Such a permanently open first through-opening and/or outlet opening may be provided adjacent to a second through-opening for a gaseous medium. This may be advantageous, for example, for a hydrogen or oxygen supply opening or a hydrogen or oxygen discharge opening as the second through-opening, in which case condensed water can be discharged via the first through-opening and/or outlet opening. However, instead of a continuous discharge of the condensate, it is also possible here to provide a temporarily interrupted discharge, for example via a valve or—if the plate assembly is installed in a vehicle—depending the road situation.

The second separator plate usually has a plurality of second through-openings, for example for supplying and removing reaction media or cooling fluid. There are a plurality of projection areas of the first separator plate corresponding to the number of second through-openings. It may be provided that the first separator plate has no through-opening in the region of at least one of the projection areas. In addition, in the region of at least one of the other projection areas, the first separator plate may have a first through-opening, the area of which is less than 20% of the area of the second through-opening.

It may be provided that the first separator plate has the first through-opening only when the second through-opening of the second separator plate is designed for the passage of selected media, such as cooling fluid. If the second through-openings are designed for the passage of reaction media, the first separator plate may be closed in the region of the projection area. As mentioned above, however, it may also be advantageous here if the second through-opening of the second separator plate is designed for the passage of a medium, wherein it may be that it is not the actual medium that is conducted through or away, but rather condensate in the medium.

Optionally, the outer contour of the first through-opening may differ from an outer contour of the second through-opening. In other words, the through-openings in this embodiment are each of different shape. Despite the difference in size of the through-openings, the first through-opening and the second through-opening may alternatively also have the same shape, for example circular.

As indicated above, the end plate on the one hand and the separator plates on the other hand may be manufactured from materials that have different thermal expansion coefficients. Usually, a plate body of the end plate is at least partially or mainly made of a polymer material; this usually applies even when the end plate is part of a terminal plate, which may additionally comprise an outer plate made of a different material. Furthermore, a plate body of the first separator plate and a plate body of the second separator plate may each be made of a metal material.

It may be provided that the first separator plate has at least one embossed structure in the region of the projection area. The embossed structure may be produced, for example, by means of hydroforming, deep-drawing or embossing. The embossed structure may in this case perform various functions, for example guiding media and/or stiffening the first separator plate in the region of the projection area and/or supporting the first separator plate against the end plate.

In some embodiments, at least one media-guiding structure is arranged in the region of the projection area. This media-guiding structure is usually part of the first separator plate, but it may alternatively also be provided as a separate element. Alternatively, the media-guiding structure is part of the end plate. In the second separator plate, passages or lead-through structures may be arranged around the second through-opening. The media-guiding structure may be inclined in such a way that the fluid is directed towards these passages or to the outlet opening of the end plate. The media-guiding structure often extends into the second through-opening or into the outlet opening or through the second through-opening or the outlet opening. Said embossed structure may be or may include the media-guiding structure.

The plate assembly may have at least one support element for supporting the first separator plate against the end plate. The support element may be arranged in the region of the projection area. The support element may be formed integrally with the first separator plate or the end plate or may be designed as a separate element. Said embossed structure may be or may include the support element.

In some embodiments, at least one stiffening structure is arranged in the region of the projection area of the first separator plate in order to stiffen this region. Said embossed structure may be or may include the stiffening structure.

The first separator plate and the second separator plate are typically connected to one another in a materially bonded manner, such as by means of welded joints, laser-welded joints or solder joints. Often the first separator plate and the second separator plate together form a terminal bipolar plate. This terminal bipolar plate is sometimes also referred to as a unipolar plate.

According to some embodiments, the second separator plate has a second sealing element, which surrounds the second through-opening. Furthermore, the first separator plate may have a spring element, which surrounds the projection area of the second through-opening on the first separator plate. The spring element usually adjoins the end plate and supports the first separator plate against the end plate. The spring element of the first separator plate and the sealing element of the second separator plate may be formed by structurally identical elements, for example by beads embossed into the respective separator plate or elastomers applied thereto. The sealing element and the spring element may have an identical shape, an identical size and/or an identical material. The spring element can therefore be referred to as the first sealing element on account of the structural similarity, but has no sealing function because there is no need for a sealing element due to the sealing material of the first separator plate in the region of the projection area. Instead, the spring element is provided in order to keep a compression force along the stack as constant as possible. The spring element is subjected to pressure in the installed stack or electrochemical system. The second sealing element may have a coating for micro-sealing, for example a screen-printed coating. The spring element may likewise have such a coating.

The second sealing element may define a sealing line, along which the second sealing element extends around the second through-opening. The spring element may define a line, along which the spring element extends around the projection area or second through-opening. The sealing line of the second sealing element and the line of the spring element may coincide in parallel projection.

The present disclosure additionally proposes a stack, such as for an electrochemical system. The stack comprises the plate assembly of the type described above. In addition, the stack comprises a further end plate that has a plurality of media ports. The media ports of the further end plate are fluidically connected to second through-openings of the second separator plate. Furthermore, the separator plates are arranged between the two end plates. The further end plate thus differs from the aforementioned end plate by the media ports. The further bipolar plate is typically adjoined by a further terminal bipolar plate comprising two separator plates, wherein the two separator plates of this further terminal bipolar plate have aligned through-openings, which are fluidically connected to the media ports of the further end plate. The further terminal bipolar plate differs in this respect from the terminal bipolar plate mentioned above. The stack usually comprises a plurality of bipolar plates arranged between the end plates and/or the terminal bipolar plates.

Also proposed is an electrochemical system, which contains a plate assembly of the type described above.

A terminal bipolar plate for an electrochemical system is also provided. The terminal bipolar plate comprises:
- a first separator plate which has a plate plane,
- a second separator plate which adjoins the first separator plate, the second separator plate having at least one media-guiding second through-opening. An orthogonal projection of the second through-opening onto the first separator plate perpendicular to the plate plane defines a projection area, wherein the first separator plate has in the region of the projection area
  no through-opening or
  a first through-opening, the area of which is less than 20% of the area of the second through-opening.

Features of the above-described plate assembly which relate to the first separator plate and/or the second separator plate can also be combined with the terminal bipolar plate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be explained in greater detail with reference to accompanying figures. In the figures:

FIG. 3 schematically shows a section through a portion of the plate stack of the electrochemical system of FIG. 1;

FIG. 4 schematically shows a section through a portion of the plate stack of the electrochemical system of FIG. 1 according to one embodiment;

FIG. 5A schematically shows a plan view of a terminal bipolar plate according to one embodiment;

FIG. 5B schematically shows a section through a portion of a plate assembly comprising the terminal bipolar plate of FIG. 5A;

FIG. 6A schematically shows a plan view of a terminal bipolar plate according to one embodiment;

FIG. 6B schematically shows a section through a portion of a plate assembly comprising the terminal bipolar plate of FIG. 6A, along section line B-B;

FIG. 7A schematically shows a plan view of a terminal bipolar plate according to one embodiment;

FIG. 7B schematically shows a section through a portion of a plate assembly comprising the terminal bipolar plate of FIG. 7A, along section line C-C;

FIG. 8 schematically shows a section through a portion of a plate assembly according to one embodiment; and FIG. 9 schematically shows a section through a portion of a plate assembly according to one embodiment; and FIG. 10 schematically shows a section through a portion of a plate assembly according to one embodiment.

FIGS. 1-10 are shown approximately to scale.

DETAILED DESCRIPTION

Figures 1, 2:
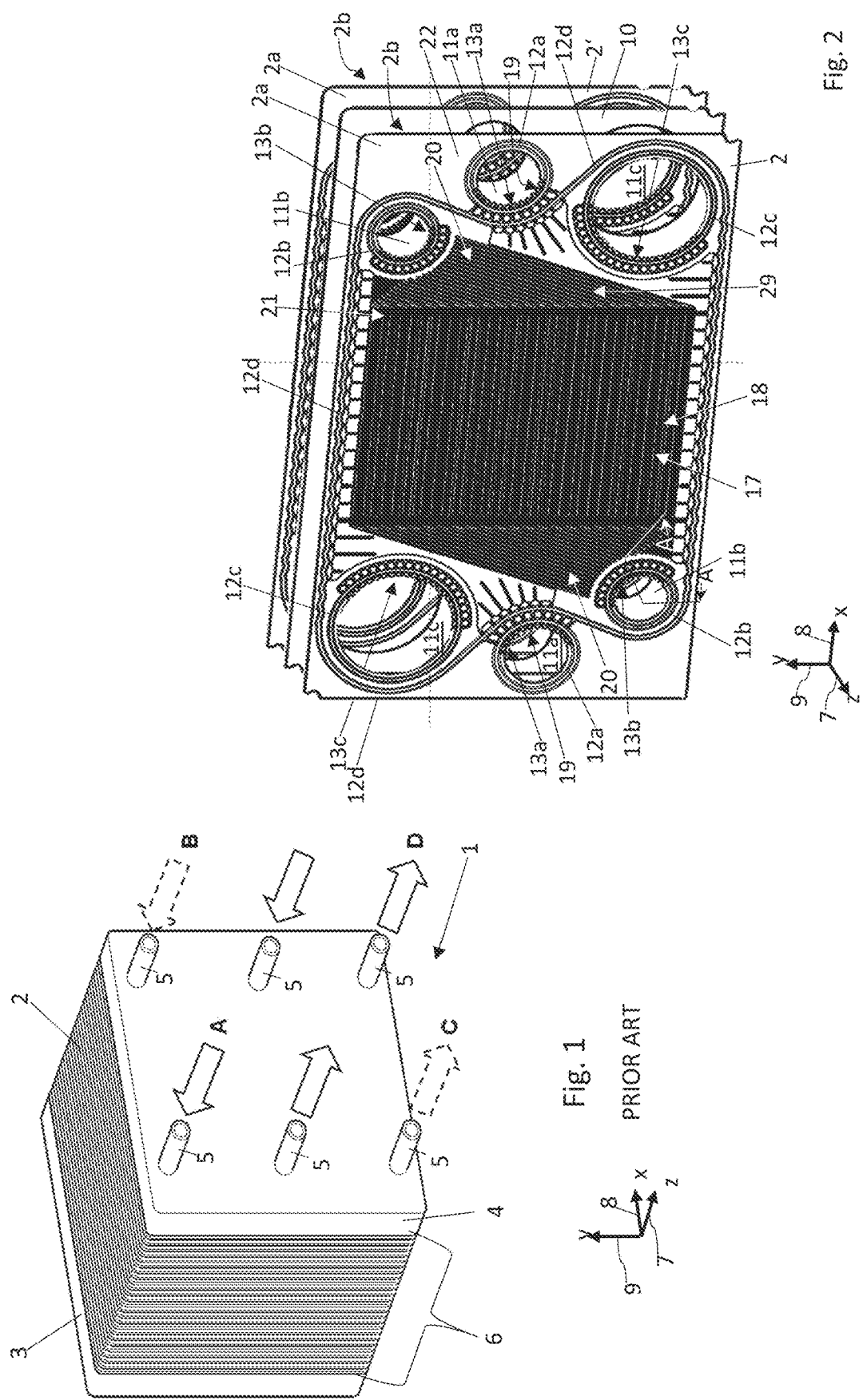
FIG. 1 schematically shows, in a perspective view, an electrochemical system comprising a plurality of separator plates or bipolar plates arranged in a stack.
FIG. 2 schematically shows, in a perspective view, two bipolar plates of the system according to FIG. 1 with a membrane electrode assembly (MEA) arranged between the bipolar plates.

In the following description and in the figures, recurring and functionally identical features are provided with the same reference signs. For reasons of clarity, reference signs are sometimes not specified in each example, even though the associated elements may be present in the example in question.

FIG. 1 shows an electrochemical system 1, for example of the type proposed here, comprising a plurality of structurally identical metal separator plates or bipolar plates 2, which are arranged in a stack and are stacked along a z-direction 7. To form the electrochemical cells of the system 1, a membrane electrode assembly (MEA) is arranged in each case between adjacent bipolar plates 2 of the stack 6 (see for example FIG. 2). Each MEA typically contains at least one membrane, for example an electrolyte membrane. Furthermore, a gas diffusion layer (GDL) may be arranged on one or both surfaces of the MEA. The bipolar plates 2 and the MEAs 10 of the stack 6 are clamped between a first end plate 3 and a second end plate 4. The z-direction 7 will also be referred to as the stacking direction. In the present example, the system 1 is a fuel cell stack 6. Each two adjacent bipolar plates 2 of the stack 6 therefore enclose between them an electrochemical cell, which serves for example to convert chemical energy into electrical energy.

In alternative embodiments, the system 1 may also be designed as an electrolyzer, as a compressor, as a humidifier for an electrochemical system, or as a redox flow battery. Separator plates, such as bipolar or monopolar plates constructed from two individual plates, can likewise be used in these electrochemical systems. The structure of these bipolar or monopolar plates may then correspond to the structure of the bipolar plates 2 explained in detail here, although the media guided on and/or through the bipolar or monopolar plates in the case of an electrolyzer, an electrochemical compressor or a redox flow battery may differ in each case from the media used for a fuel cell system.

The z-axis 7, together with an x-axis 8 and a y-axis 9, spans a right-handed Cartesian coordinate system. The bipolar plates 2 each define a plate plane, each of the plate planes of the separator plates being oriented parallel to the x-y plane and thus perpendicular to the stacking direction or to the z-axis 7. The second end plate 4 has a plurality of media ports 5, via which media can be supplied to the system 1 and via which media can be discharged from the system 1. Said media that can be supplied to the system 1 and discharged from the system 1 may comprise for example fuels such as molecular hydrogen or methanol, reaction gases such as air or oxygen, reaction products such as water vapor or depleted fuels, or coolants such as water and/or glycol. In the case of a humidifier, usually there is no need for temperature control and therefore only four media ports are then present instead of the six media ports 5 shown in FIG. 1.

FIG. 2 shows, in a perspective view, two adjacent separator plates 2a, 2b or bipolar plates 2 of an electrochemical system of the same type as the system 1 from FIG. 1, as well as a membrane electrode assembly (MEA) 10 which is arranged between said adjacent separator plates 2, the MEA 10 in FIG. 2 being largely obscured by the separator plate 2 facing towards the viewer. The separator plate 2 is formed of two individual plates 2a, 2b which are joined together in a materially bonded manner (see for example FIG. 3), of which only the first individual plate 2a facing towards the viewer is visible in FIG. 2, said first individual plate obscuring the second individual plate 2b. The individual plates 2a, 2b may be made of sheet metal, such as stainless steel sheet. The individual plates 2a, 2b may for example be welded to one another, for example by laser-welded joints.

The separator plates 2a, 2b have through-openings, which are aligned with one another and form through-openings 11a-c of the bipolar plate 2. The MEA 10 also has corresponding aligned through-openings, the specification of a separate reference sign being omitted here for reasons of clarity. When a plurality of bipolar plates of the same type as the bipolar plate 2 and MEAs 10 are stacked, the through-openings 11a-c together with the corresponding through-openings of the MEAs 10 and/or the electrically insulating edge regions of the MEAs 10' form lines which extend through the stack 6 in the stacking direction 7 (see for example FIGS. 1, 3 and 4). Typically, each of the lines formed by the through-openings 11a-c is fluidically connected to one of the ports 5 in the second end plate 4 of the system 1. For example, coolant can be introduced into the stack 6 or discharged from the stack 6 via the lines formed by the through-openings 11a. In contrast, the lines formed by the through-openings 11b, 11c may be designed to supply fuel and reaction gas to the electrochemical cells of the fuel cell stack of the system 1 and to discharge the reaction products from the stack. FIG. 1 does not show that electrical connections are likewise arranged on the second end plate 4, via which an electrical consumer can be connected to the fuel cell stack 6.

In order to seal off the through-openings 11a-c with respect to the interior of the stack 6 and, at least in the case of the through-openings 11a, with respect to the surrounding environment, the first separator plate 2a may in each case have sealing arrangements in the form of sealing beads 12a-c, which are in each case arranged around the through-openings 11a-c and in each case completely surround the through-openings 11a-c. On the rear side of the bipolar plates 2, facing away from the viewer of FIG. 2, the second separator plate 2b may have corresponding sealing beads for sealing off the through-openings 11a-c (not shown).

In a region 18 located opposite the electrochemically active region of the MEA 10, the first separator plates 2a usually have, on the front side thereof facing towards the viewer of FIG. 2, a flow field 17 with structures for guiding a reaction medium along the front side of the separator plate 2a. In FIG. 2, these structures are defined by a plurality of webs and channels extending between the webs and delimited by the webs. On the front side of the bipolar plate 2, facing towards the viewer of FIG. 2, the first separator plate 2a usually additionally has a distribution or collection region 20 with distributing channels 29. The distribution or collection region 20 comprises structures which are designed to distribute over the flow field 17 a medium that is introduced into the distribution or collection region 20 from a first of the two through-openings 11b, and/or to collect or to pool a medium flowing towards the second of the through-openings 11b from the flow field 17. In FIG. 2, the distributing structures of the distribution or collection region 20 are likewise defined by webs and channels 29 extending between the webs and delimited by the webs. At the transition between the distribution and collection region 20 and the flow field 17, a transition region 21 is located on each side of the flow field 17, each of said transition regions being oriented parallel to the y-direction 9 in FIG. 2. In the transition region 21, the media-guiding structures may have for example a reduced height compared to the adjoining regions 17 and 20 (see FIG. 3).

In the exemplary embodiment shown, the first separator plates 2a each also have a further sealing arrangement in the form of a perimeter bead 12d, which extends around the flow field 17 located opposite the active region 18, and also around the distribution or collection region 20 and the through-openings 11b, 11c and seals these off with respect to the through-opening 11a, that is to say with respect to the coolant circuit, and with respect to the environment surrounding the system 1. An area 22 of the first separator plates 2a is outside the perimeter bead 12d. The second separator plates 2b each comprise corresponding perimeter beads. The structures of the flow field 17, the distributing structures of the distribution or collection region 20 and the sealing beads 12a-d are each formed in one piece with the separator plates 2a and are integrally formed in the separator plates 2a, for example in an embossing or deep-drawing process or by means of hydroforming. The same applies to the corresponding structures of the second separator plates 2b.

The two through-openings 11b or the lines through the plate stack 6 of the system 1 that are formed by the through-openings 11b are often each fluidically connected to one another via passages 13b in the sealing beads 12b, via the distributing structures of the distribution or collection region 20 and of the transition region 21 and via the flow field 17 of the first separator plates 2a facing towards the viewer of FIG. 2. Analogously, the two through-openings 11c or the lines through the plate stack of the system 1 that are formed by the through-openings 11c are each fluidically connected to one another via corresponding bead passages, via corresponding distributing structures, transition regions and via a corresponding flow field on an outer side of the second separator plates 2b facing away from the viewer of FIG. 2. In contrast, the through-openings 11a or the lines through the plate stack of the system 1 that are formed by the through-openings 11a are usually each fluidically connected to one another via a cavity 19 that is enclosed or surrounded by the separator plates 2a, 2b. This cavity 19 serves in each case to guide a coolant through the bipolar plate 2, such as for cooling the flow field 17 of the bipolar plate 2 and thus indirectly the electrochemically active region 18 of the MEA 10.

FIG. 3 shows a section through the system 1 according to the prior art in the region of the through-openings 11b. It is possible to see here the first end plate 3 and a plurality of bipolar plates 2 comprising separator plates 2a, 2b. Bipolar plates 30 adjoining the end plates 3, 4 are often called terminal bipolar plates or unipolar plates. The bipolar plates 2 of the fuel cell stack 6 and the terminal bipolar plates 30 may be embossed metal parts made of stainless steel having a longitudinal thermal expansion coefficient of $1.6 \cdot 10^{-5} K^{-1}$. In contrast, the end plates 3, 4 are made mainly of a plastic that has for example a longitudinal thermal expansion coefficient of approximately $5.0 \cdot 10^{-5} K^{-1}$, wherein here the differences are much greater between different plastics than between different steel materials. The terminal bipolar plates 30 therefore in each case have a lower longitudinal thermal expansion coefficient than the end plates 3 and 4 that they adjoin. As a result, for example the first end plate 3 and the adjoining terminal bipolar plate 30 do not vary their lateral expansion in the x-y plane perpendicular to the stacking axis 7 to an equal extent when the temperature of the first end plate 3 and of the terminal bipolar plate 30 increases or decreases by the same amount. The different thermal expansion of the terminal bipolar plate 30 and of the first end plate 3 leads to a relative shift between regions of the two plates 3 and 30. This is not an absolute shift, but rather, from a simplified point of view, an increasing lateral shift between the regions of the two plates 3 and 30 occurs as the distance of the plate regions from the centre of gravity of the terminal bipolar plate 30 increases. Furthermore, the shift is influenced by different temperature distributions and temperature changes, for example depending on the material thickness. Such temperature changes may be caused by a change in the ambient temperature, cold starting of the fuel cell system at a low ambient temperature, or an increase or decrease in temperature inside the fuel cell stack 6, for example as a result of waste heat being generated when converting chemical energy into electrical energy. These relative movements may have a disadvantageous effect on an elastomeric sealing device or coating 28 of the system 1, which is arranged between one of the bead arrangements 12a-12d of the terminal bipolar plate 30 and the first end plate 3. Furthermore, it has been found in practice that the end plates 3 made of a plastic material react more slowly to temperature changes than the separator plates made of a steel material, which at least temporarily enhances the differences and relative shifts. Moreover, the metal separator plates undergo direct cooling, at least in some regions, whereas no active cooling or temperature control is provided for the end plates.

The present disclosure was conceived in order to address or at least mitigate the above problems as well as others.

FIGS. 4A, 4B, 5A, 5B, 6A, 6B, 7A, 7B, 8, 9 and 10 show various terminal bipolar plates 30 and plate assemblies 50 which can be installed in the electrochemical system 1 or the stack 6 of FIG. 1. Each of the illustrated plate assemblies 50 comprises an end plate 52 as well as a first separator plate 31, which adjoins the end plate 52 and which has a plate plane, and a second separator plate 32, which adjoins the first separator plate 31, these plates together forming a terminal bipolar plate 30 or unipolar plate 30. As shown in FIGS. 4A, 4B, 5A, 5B, 6A, 6B, 7A, 7B, 8, 9 and 10, the second separator plate 32 has at least one media-guiding second through-opening 42 with an edge 43, which may correspond to one of the through-openings 11a-c of FIGS. 2, 3. In other words, the second separator plate 32 may have the same through-openings 11a-c as the separator plate 2b shown in FIGS. 2, 3.

An orthogonal projection of the second through-opening 42 onto the first separator plate 31 perpendicular to the plate plane defines a projection area 40. The first separator plate 31 has in the region of the projection area 40 either no through-opening (cf. FIGS. 4, 5A, 5B, 7A, 7B, 8, 10) or a first through-opening 41 (cf. FIGS. 6A, 6B, 9), the area of which is less than 20%, less than 10% or less than 5% of the area of the second through-opening 42.

The second separator plate 32 may be designed in substantially exactly the same way as the separator plates 2b described above. However, in a manner differing from the first separator plate 2a, the first separator plate 31 has, at the location where the second separator plate 32 has the second through-opening 42, either no through-opening or a first through-opening 41 which is much smaller than the second through-opening 42.

The first separator plate 31 of FIGS. 4, 5A, 5B, 7A, 7B, 8 and 10 is therefore closed in the region of the projection area 40, so that plate material of the separator plate 31 adjoins the second through-opening 42. This has the advantage that the region is already sealed off by the material of the first separator plate 31. For this reason, there is no need for a sealing arrangement between the first separator plate 31 and the end plate 52. In order to ensure that the compression force in the stack 6 along the stacking direction 7 is of similar magnitude in the region of the terminal bipolar plate 30 as in other regions of the stack 6, a spring element 48 may be provided, which adjoins the end plate 52 and which supports the first separator plate 31 against the end plate 52. This spring element 48 may have the same bead-like structure as the bead arrangements 12a-12c mentioned above. Furthermore, the second separator plate comprises a sealing element 49, which is constructed in the same way as the bead arrangements 12a-c. Reference is therefore made to what has been stated above. The spring element 48 and the sealing element 49 are thus provided on opposite sides of the terminal bipolar plate 30. The spring element 48 and/or the sealing element 49 may additionally have a coating 28 for micro-sealing, such as a screen-printed coating, which may likewise be applied to the bead arrangements 12a-d and corresponds to the coating 28 shown in FIG. 3. Here, the coating 28 may be applied to the tops and/or flanks of the bead arrangements. The spring element 48 together with the coating 28 may therefore have the effect that the terminal bipolar plate 30 is compressed with the end plate 52 in the same way as the other bipolar plates 2 of the stack 6 are compressed with each other. The resulting very homogeneous force distribution across the entire stack 6 and across all the spring elements and sealing elements 48, 49, 12a-d is advantageous with regard to the durability of these elements.

In the embodiments of FIGS. 5A, 5B, 6A, 6B, 7A, 7B, the first separator plate 31 has at least one embossed structure 44 in the region of the projection area 40. The embossed structure 44 may in this case be formed in the first separator plate 31 in a manner analogous to the above-described embossed structures by deep-drawing, hydroforming or embossing. As will be described below, the at least one embossed structure 44 may perform various functions and may for example be designed as a media-guiding structure 45, support element 46 or stiffening element 47. For the sake of clarity, with regard to the embossed structures 44, the plan view of FIG. 5A deliberately shows only those lines that lie outside the plate plane E in the associated sectional view 5B.

The embossed structures 44 of FIGS. 5A-6B have substantially the same circumferential shape as the second through-opening 32 and are arranged coaxial with one another. In the embodiment shown in FIG. 5A and FIG. 5B, the circumferential shapes of the embossed structures 44 and of the second through-opening 32 are annular, or circular. In the embodiment shown in FIG. 6A and FIG. 6B, the circumferential shapes of the embossed structures 44 and of the second through-opening 32 are trapezoidal. However, other circumferential shapes of the embossed structures 44 and of the second through-opening 32 are also conceivable, for example oval, rectangular or square shapes or free forms.

In FIGS. 5A, 5B, the inner embossed structure 44 is designed as a support element 46, which is designed to support the first separator plate 31 against the end plate 52. Furthermore, the outer embossed structure 44 is designed as a stiffening element 47 and stiffens the first separator plate 31 in the region of the projection area 40. The embossed structures 44 of FIGS. 5A, 5B point in the same direction and face towards the end plate 52. It is additionally clear from FIG. 5B that the first separator plate 31 has no passage, whereas in the separator plate 2a located closest to the terminal bipolar plate 30 passages 13*b* are formed or punched out on both sides of the bead 12*b*.

Embossed structures 44 may likewise be provided in the plate assembly 50 of FIG. 6, wherein the outer and the middle embossed structure 44 are both designed as stiffening elements 47. The two embossed structures 44 point in different directions and face towards and away from the end plate 52.

In contrast to the embodiment of FIGS. 5A and 5B, the first separator plate of FIGS. 6A, 6B has a first through-opening 41 which is located centrally in the region of the first separator plate 31 defined by the projection area 40. Positions other than the central position shown are also conceivable. The first through-opening 41 is fluidically connected to an outlet opening 54 formed in the end plate 52.

In the embodiment of FIG. 6B, the first through-opening 41 is designed as a vent opening. In its capacity as a vent opening, the first through-opening 41 can be left open, for example when filling the electrochemical system 1 with cooling fluid or reaction media, as a result of which air located in the system 1 can escape via the first through-opening 41 and the outlet opening 54. After filling, the through-opening 41 and/or the outlet opening 54 can be sealingly closed by a closure, such as a closure cap. Venting of the system 1, of the stack 6 or of the plate assembly 50 is also possible immediately prior to commissioning of the stack 6 or system 1. A permanently open mode of the first through-opening 41 and outlet opening 54 is also conceivable and usually depends on the other operating conditions.

A media-guiding structure 45 may be provided annularly around the first through-opening 41, which media-guiding structure may be designed for example as a conical embossed structure 44 and faces towards the end plate 52 and the outlet opening 54 of the end plate 52. By virtue of its orientation and conical shape, the fluid-guiding structure 45 guides a fluid in the direction of the outlet opening 54. As shown in FIG. 6B, the fluid-guiding structure 45 may extend into the outlet opening 54. In some embodiments (not shown), the fluid-guiding structure 45 even extends through the outlet opening 54. For venting purposes, a valve 60 may optionally be provided, for example at the outlet opening 54, at the first through-opening 41, or in a fluid path between the outlet opening and the first through-opening 41. Such a valve 60 is shown for example in FIG. 9.

Compared to FIG. 2 and FIG. 5A, FIG. 6A shows a fundamentally different arrangement of the media through-openings 11*a-c*, of the associated port beads 12*a-c* and of the perimeter bead 12*d*. For further details, reference is made to WO 2019/229138 A1, the content of which is hereby fully incorporated as part of the present application. Reference is made to the separator plate of FIG. 4 of WO 2019/229138 A1. However, the fundamental problem of the different thermal expansion coefficients and sealing lines shifted relative to one another between the end plate and the terminal bipolar plate still exists, regardless of this different arrangement.

A media-guiding structure 45 is likewise provided in the embodiment of FIGS. 7A, 7B, which media-guiding structure, as an embossed structure 44, is formed integrally with the first separator plate 31.

The media-guiding structure 45 of FIGS. 7A, 7B differs from the media-guiding structure 45 of FIGS. 6A, 6B in that it faces away from the end plate 52 and extends into the second through-opening 42 or through the second through-opening 42. The media-guiding structure 45 of FIGS. 7A, 7B is designed for example to guide a fluid in the direction of passages 33 which are formed on the one hand between the separator plates 31, 32 and on the other hand in a bead flank 34 of the second separator plate 32. As a result, hydrogen, for example, or another fluid can be conducted into the space formed between the separator plates 31, 32. To emphasize the asymmetrical shape of the projection area 40, a few additional circular lines are indicated in FIG. 7A.

In FIGS. 5A, 5B, 6A, 6B, 7A, 7B, the fluid-guiding structure 45, the support element 46 and the stiffening element 47 are each designed as an embossed structure 44 and as such are formed integrally with the first separator plate 31. In alternative embodiments, the elements 45, 46, 47 may also be in the form of separate elements or may be formed by the end plate 52 (cf. for example FIG. 9 and the associated description below).

Instead of a bead embossed into the respective separator plate in a manner comparable to the bead arrangements 12*a*-12*c*, the spring element 48 and/or the sealing element 49 may alternatively be formed of elastomeric material, for example as an O-ring. Such an embodiment is shown in FIGS. 8 and 9. It can be seen that the spring element 48 is arranged between the first separator plate 31 and the end plate 52 and bears against both. Furthermore, the sealing element 49 is arranged on the second separator plate 32. The spring element 48 and the sealing element 49 can be connected to the separator plates 31, 32 by means of known measures, such as adhesive bonds.

In addition to the end plate 52, the plate assembly 50 of FIG. 8 additionally also comprises at least one outer plate 57, which together with the end plate 52 forms a terminal plate 58. The end plate 52 is located between the outer plate 57 and the first separator plate 31 and has primarily an insulating function, while the outer plate 57 is provided mainly for compressing the stack 6. Although the configuration with the outer plate 57 and the terminal plate 58 is shown only in FIG. 8, it may also be provided in the embodiments of FIGS. 5B, 6B, 7B, 9, 10.

In addition to the plate assembly 50 of FIG. 8, the plate assembly 50 of FIG. 9 comprises at least one elastomeric support element 56 or a single elastomeric, annular support element 56, which is arranged between the end plate 52 and the first separator plate 31. A fluid line 55 formed by the end plate 52 is also provided, which is fluidically connected to the first through-opening 41 of the first separator plate 31. The fluid line 55 may advantageously also have a supporting effect. The vent valve 60 is arranged in the fluid line 55. The fluid line 55 may alternatively also be in the form of a separate element and may be arranged between the first separator plate 31 and the end plate 52.

In contrast, FIG. 10 shows a plate assembly 50 which comprises only an end plate 52 and no multi-part terminal plate 58. The end plate 52 in this case bears directly against the terminal bipolar plate 30, so that no spring element 48 is arranged between the terminal bipolar plate 30 and the end plate 52.

In the plate assemblies 50 shown in FIGS. 4, 5A, 5B, 6A, 6B, 7A, 7B, 8, 9 and 10, a plate body of the end plate 52 may be at least partially or mainly made of a plastic such as a polymer material. Furthermore, a plate body of the first separator plate 31 and a plate body of the second separator plate 32 are usually each made of a metal material, wherein the latter may be coated at least in some regions.

It should be noted that the embodiments of FIGS. 4, 5A, 5B, 6A, 6B, 7A, 7B, 8, 9 and 10 can be combined with one another, since the second separator plate 32 usually has six or, in the case of systems without cooling, four second through-openings 11*a-c*, cf. FIG. 1. There are then also six projection areas 40 on the first separator plate 31. Therefore, the first separator plate 31 may have no through-opening in the region of at least one of the projection areas 40. In addition, the first separator plate 31 may have in the region of at least one of the remaining projection areas 40 a first through-opening 41, the area of which is less than 20% of the area of the corresponding second through-opening 42.

With the exception of the region of the first separator plate 31 inside the projection area 40 and the features thereof (for example first through-opening 41, embossed structure 44, media-guiding structure 45, support element 46, stiffening element 47), the first separator plate 31 may be identical to the individual plate 2a. The end plate 52 shown in FIGS. 4, 5B, 7B, 8 and 10 may be designed substantially in the same way as the first end plate 3 described above, while the end plate of FIGS. 6B and 9 additionally comprises the outlet opening 54 and the fluid line 55. The second separator plate 32 and the individual plate 2b may be of identical design.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A plate assembly for an electrochemical system, comprising:
    an end plate, and
    a terminal bipolar plate comprising a first separator plate which adjoins the end plate and which has a plate plane, and a second separator plate which adjoins and is connected to the first separator plate, the second separator plate having at least one media-guiding second through-opening,
    wherein an orthogonal projection of the second through-opening onto the first separator plate perpendicular to the plate plane defines a projection area, and
    wherein the projection area of the first separator plate has no through-opening or a first through-opening, the area of which is less than 20% of the area of the second through-opening.

2. The plate assembly according to claim 1, wherein a plate body of the end plate is at least partially or mainly made of a polymer material, a plate body of the first separator plate and a plate body of the second separator plate each being made of a metal material.

3. The plate assembly according to claim 1, wherein the first separator plate has at least one embossed structure in the projection area.

4. The plate assembly according to claim 1, wherein at least one media-guiding structure is arranged in the projection area.

5. The plate assembly according to claim 4, wherein the media-guiding structure extends into the second through-opening or through the second through-opening.

6. The plate assembly according to claim 1, comprising at least one support element for supporting the first separator plate against the end plate, and the support element arranged in the projection area.

7. The plate assembly according to claim 6, wherein the support element is formed integrally with the first separator plate.

8. The plate assembly according to claim 6, wherein the support element is a separate element not integrally formed with the first separator plate or the end plate.

9. The plate assembly according to claim 1, wherein the first through-opening is a vent opening.

10. The plate assembly according to claim 9, wherein the projection area has a first through-opening, and wherein the end plate has an outlet opening, which is fluidically connected to the first through-opening.

11. The plate assembly according to claim 1, wherein the first separator plate and the second separator plate are connected to one another by welded joints, laser-welded joints, or solder joints.

12. The plate assembly according to claim 1, wherein the second separator plate has a second sealing element, which surrounds the second through-opening, and the first separator plate has a first spring element, which surrounds the projection area of the second through-opening on the first separator plate.

13. An electrochemical system, comprising a plate assembly according to claim 1 and a further end plate that has a plurality of media ports, wherein the media ports of the further end plate are fluidically connected to second through-openings of the second separator plate, the first separator plate and the second separator plate being arranged between the two end plates.

14. A terminal bipolar plate for an electrochemical system, comprising:
- a first separator plate which has a plate plane; and
- a second separator plate which adjoins the first separator plate, the second separator plate having at least one media-guiding second through-opening;
- wherein the first separator plate and the second separator plate are two layers of the terminal bipolar plate which are joined together;
- wherein an orthogonal projection of the second through-opening onto the first separator plate perpendicular to the plate plane defines a projection area; and
- wherein the projection area of the first separator plate has no through-opening or a first through-opening, the area of which is less than 20% of the area of the second through-opening.

15. The terminal bipolar plate according to claim 14, wherein the first separator plate and the second separator plate are positioned between a cell plate and an end plate.

* * * * *